(12) United States Patent
Niot

(10) Patent No.: US 6,226,736 B1
(45) Date of Patent: *May 1, 2001

(54) MICROPROCESSOR CONFIGURATION ARRANGEMENT FOR SELECTING AN EXTERNAL BUS WIDTH

(75) Inventor: Francois Niot, Biot (FR)

(73) Assignee: Philips Semiconductors, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/813,274

(22) Filed: Mar. 10, 1997

(51) Int. Cl.⁷ ........................................................ G06F 9/00
(52) U.S. Cl. .......................... 712/38; 712/229; 712/43; 710/66; 713/2
(58) Field of Search .................................. 709/221, 250; 710/126, 127, 129, 66; 712/210, 229, 43, 38, 39, 40; 713/600, 2

(56) References Cited

U.S. PATENT DOCUMENTS 4,276,594 * 6/1981 Morley .................................. 713/600
5,603,048 * 2/1997 Shindo et al. ........................ 710/127
5,613,078 * 3/1997 Kishigami .............................. 712/33
5,615,402 * 3/1997 Quattromani et al. ................. 712/38
5,724,553 * 3/1998 Shigeeda .............................. 711/170
5,737,764 * 4/1998 Shigeeda .............................. 711/170

OTHER PUBLICATIONS

Ian Hirschon, "Personal Supercomputing: Cray's ideas turn a PC into a virtual–memory 64–bit supercomputer", Dr. Dobb's Journal, Jun. 1992.*

Statement by Applicant.

* cited by examiner

Primary Examiner—Richard L. Ellis
(74) Attorney, Agent, or Firm—Crawford PLLC

(57) ABSTRACT

A microprocessor circuit arrangement is capable of retrieving and executing program instructions from a program memory having one of multiple possible bit-widths using address signals. A microprocessor uses a set of program instructions to select a memory configuration for retrieving the program instructions. The program memory stores the set of program instructions such that the microprocessor can retrieve the set of program instructions regardless of which bit-width is used to store the set of program instructions. Additional circuitry maps the address signals for retrieving the program instructions from the program memory.

20 Claims, 4 Drawing Sheets

MICROPROCESSOR CONFIGURATION ARRANGEMENT FOR SELECTING AN EXTERNAL BUS WIDTH

FIELD OF THE INVENTION

The present invention relates to microprocessor-based systems. More particularly, the present invention relates to an arrangement and method for configuring a microprocessor-based apparatus for retrieving data from a program memory.

BACKGROUND OF THE INVENTION

In many microprocessor-based systems, a microprocessor retrieves and executes program instructions. These instructions are typically stored in a program memory having a bit-width selected for compatibility with the microprocessor. For example, in some applications, the program memory is eight bits wide, while in other applications, the program memory is sixteen bits wide. Typically, a different microprocessor is used for each different bit-width.

Some microprocessors can retrieve and execute instructions from a program memory having one of multiple possible bit-widths. The microprocessor-based system is typically configured to retrieve and execute the instructions using the appropriate bit-width.

Configuring the microprocessor to use the appropriate bit-width involves placing the microprocessor in a state determined by an indication of the bit-width of the program memory. Some techniques of providing this indication involves using external pins to set the microprocessor at one of several pre-defined states. These techniques often require a dedicated pin or a pull-up or pull-down resistor on a pin already used for another purpose. In certain application environments in which device size or pin count is an important consideration, these additional components use space or pins that could otherwise be eliminated or used for other purposes.

In some microprocessor-based systems, the bit-width used by the microprocessor to retrieve and execute instructions is set using a technique known as dynamic bus sizing. The microprocessor receives a signal indicating the bit-width of the program memory from the program memory when the microprocessor accesses the program memory. In many applications using dynamic bus sizing, the program memory and the microprocessor each use dedicated pins for respectively transmitting and receiving the signals. In applications in which it is desirable to maintain a minimal pin count, dynamic bus sizing uses pins that could otherwise be used for other purposes.

SUMMARY OF THE INVENTION

According to one embodiment, the present invention is directed to a microprocessor circuit arrangement that uses a set of instructions to select a memory configuration for retrieving program instructions. The microprocessor circuit arrangement comprises: a microprocessor having address signals generated to retrieve instructions and capable of executing a set of instructions in a start-up mode; a program memory storing the set of instructions using one of a plurality of possible bitwidths in noncontiguously-addressed memory locations selected such that a set of instructions can be retrieved, regardless of which bit-width is used in storing the set of instructions; and an address-mapping circuit configured to respond to a microprocessor-reset signal by mapping the address signals for retrieving the set of instructions regardless of which bit-width is used in storing the set of instructions, the set of instructions causing the microprocessor to select a memory configuration as a function of the bit-width and to reconfigure the address-mapping circuit for retrieving additional instructions, rather than the set of instructions. A microprocessor-based system for use with the microprocessor circuit arrangement is also provided.

According to another embodiment of the present invention, a microprocessor circuit arrangement is provided. The microprocessor circuit arrangement comprises: a microprocessor having address signals generated for retrieving instructions and capable of executing a set of instructions in a start-up mode; a memory management arrangement, responsive to the microprocessor and configured and arranged to generate the address signals, to retrieve the set of instructions, and to provide the instructions to the microprocessor; a program memory storing the set of instructions using one of a plurality of possible bit-widths in noncontiguously-addressed memory locations selected such that the set of instructions can be retrieved regardless of which bit-width is used in storing the set of instructions; and an address-mapping circuit, responsive to the memory management arrangement and configured and arranged to respond to a microprocessor-reset signal by mapping the address signals for retrieving the set of instructions regardless of which bit-width is used in storing the set of instructions. The set of instructions causes the microprocessor to select a memory configuration as a function of the bit-width used in storing the set of instructions and to reconfigure the address-mapping circuit for retrieving additional instructions rather than the set of instructions.

According to another embodiment of the present invention, a method configures a microprocessor-based system after reset. The method comprises: using the microprocessor-based system to generate first address signals for retrieving instructions; in response to a microprocessor-reset signal, mapping the first address signal for retrieving a set of instructions stored in a program memory using one of a plurality of possible bit-widths in noncontiguously-addressed memory locations selected such that a set of instructions can be retrieved regardless of which bit-width is used in storing the set of instructions; executing the set of instructions; in response to executing the set of instructions, selecting a memory configuration as a function of the bit-width; and reconfiguring the microprocessor-based system for retrieving additional instructions, rather than a set of instructions. An arrangement for use in connection with this method is also provided.

According to another method embodiment of the present invention, a method for configuring a microprocessor-based system comprises: storing a set of instructions in a program memory using one of a plurality of possible bit-widths in noncontiguously-addressed memory locations selected such that the set of instructions can be retrieved, regardless of which bit-width is used in storing the set of instructions; generating first address signals for retrieving instructions; in response to a microprocessor-reset signal, mapping the first address signal for retrieving the set of instructions, regardless of which bit-width is used in storing the set of instructions; executing the set of instructions; in response to executing the set of instructions, selecting a memory configuration as a function of the bit-width; and reconfiguring the microprocessor-based system for retrieving additional instructions rather than the set of instructions.

The above summary of the invention is not intended to describe each disclosed embodiment of the present invention. This is the purpose of the figures and of the detailed description that follows.

BRIEF DESCRIPTION OF THE DRAWINGS

Other aspects and advantages of the present invention will become apparent upon reading the following detailed description and upon reference to the drawings in which.

Figure 1:
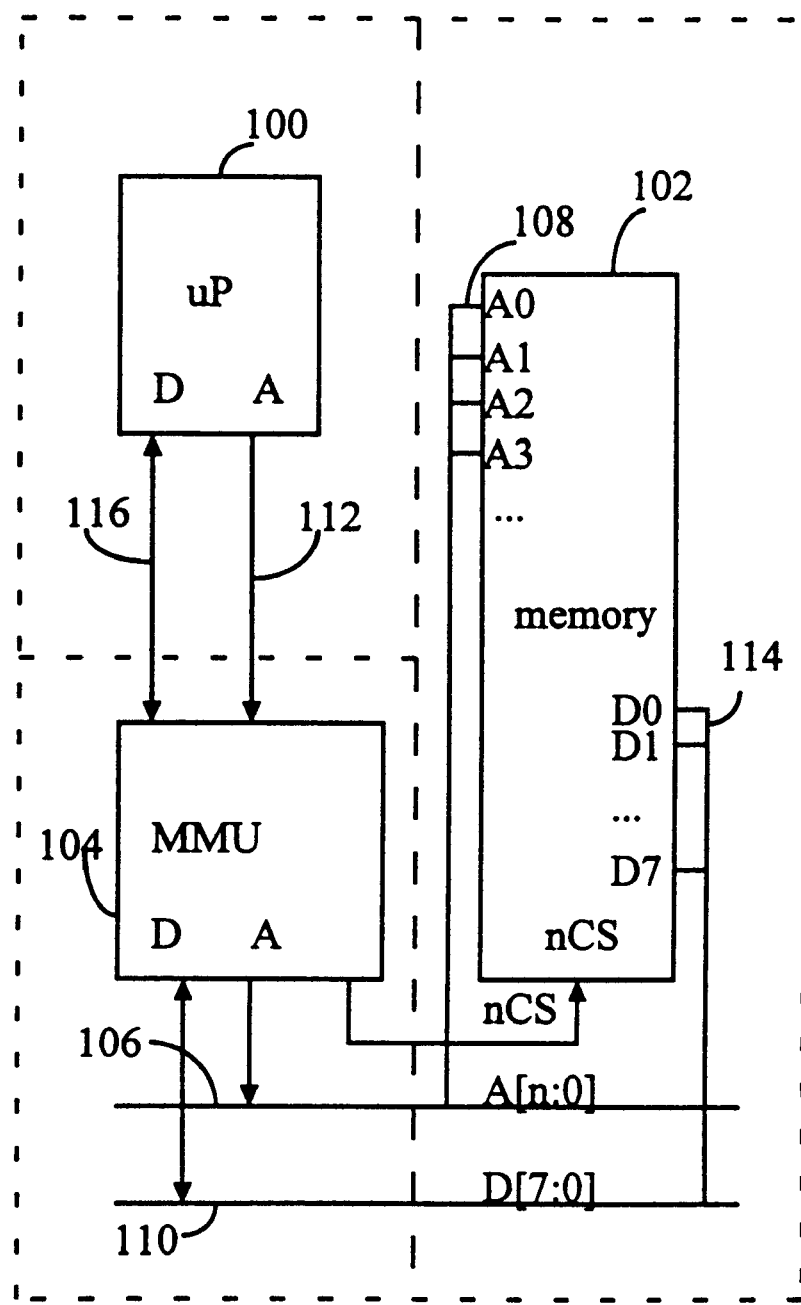
FIG. 1 is a block diagram of a microprocessor-based system, according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present invention is believed to be applicable to a variety of systems and arrangements that configure a microprocessor-based system to retrieve program instructions from a program memory that stores data using one of a plurality of possible bit-widths. The invention has been found to be particularly advantageous in application environments in which it is desirable to conserve pins and device space. An appreciation of various aspects of the invention is best gained through a discussion of various application examples operating in such an environment.

FIG. 1 is a block diagram illustrating an example microprocessor-based system according to the present invention. The microprocessor-based system of FIG. 1 may be used in any of a variety of application environments, e.g., embedded systems. The system includes a microprocessor 100, which is implemented using, for example, a conventional 8086 processor, available from Intel Corporation. A program memory 102, such as a read-only memory (ROM), a random-access memory (RAM) with battery backup, or other nonvolatile memory, stores program instructions as data words retrieved and executed by the microprocessor 100.

While the microprocessor 100 uses a single set of program instructions, the program memory 102 can be conceptually divided into boot and main areas. The boot area is relatively small and stores instructions that are executed when the microprocessor-based system resets. The main area stores additional program instructions. It should be understood that the boot area or the main area may occupy more than one address range within the program memory 102. For example, one portion of the boot area may occupy an address range offset from the address range occupied by another portion of the boot area. The microprocessor 100 accesses the program memory 102 using a memory management unit (MMU) 104, which can be integrated as part of the microprocessor 100 or implemented using a separate circuit.

The MMU 104 generates address signals for accessing the program memory 102. The address signals can be considered to represent address values corresponding to locations in the program memory 102. These address signals are communicated to the program memory 102 using an address bus 106. The program memory 102 includes a number of connectors or address pins 108 for receiving the address signals. The storage capacity or size of the program memory 102 affects the number of address pins 108 used by the program memory 102. For example, a program memory capable of storing 1024 ($2^{10}$) data words may use ten address pins 108. The MMU 104 and the program memory 102 are also connected by a data bus 110 for communicating data between the program memory 102 and the MMU 104. Data communicated using the data bus 110 includes, for example, data written into and read from the program memory 102.

The microprocessor 100 retrieves instructions from the program memory 102 by transmitting an address to the MMU 104 using an address bus 112. The MMU 104 converts this address into the address signals for retrieving instructions from the program memory 102. The MMU 104 then enables and accesses the program memory 102 and retrieves data, such as program instructions, from the program memory 102 using the data bus 110. A set of data pins 114 of the program memory 102 provides the data to the data bus 110, from which the MMU 104 receives the data. The retrieved data is then presented to the microprocessor 100 using a data bus 116.

The MMU 104 also converts cycles of the microprocessor 100 to cycles for accessing the program memory 102. If the microprocessor 100 requests a 16-bit data word and the program memory 102 stores 8-bit data words, the MMU 104 performs two consecutive accesses to the program memory 102 to retrieve two 8-bit data words. For example, when the microprocessor-based system is reset in response to a microprocessor-reset signal, the microprocessor 100 sends an address, e.g., 0 to the MMU 104. It should be understood that certain microprocessors initially retrieve instructions from nonzero addresses. For example, the 8086 microprocessor retrieves instructions beginning at a hexadecimal address 0xFFF0. If the microprocessor 100 initially retrieves instructions from the address of 0, the MMU 104 sends address signals representing addresses of 0 and 1 to the program memory 102. As a result, the program memory 102 returns the 8-bit data words stored at locations 0 and 1 to the MMU 104, which returns them as a single 16-bit data word to the microprocessor 100. After processing the 16-bit data word, the microprocessor 100 sends an address of 2 to the MMU 104. The MMU 104 then addresses and retrieves 8-bit data words from locations 2 and 3 of the program memory 102 and presents them as a 16-bit data word to the microprocessor 100.

While the microprocessor 100 and the MMU 104 have been described as discrete components, it will be appreciated by those skilled in the art that, in some application environments, the MMU 104 is integrated into the microprocessor 100. The dashed lines on FIG. 1 indicate that the microprocessor 100 and the MMU 104 can be implemented using a single integrated circuit or multiple integrated circuits. In the discussion that follows, it should be understood that the operations described as performed by an MMU can alternatively be performed by an analogous component of a microprocessor. In addition, the program memory 102 can be integrated with the microprocessor 100, the MMU 104, or both in a single integrated circuit.

Figure 2:
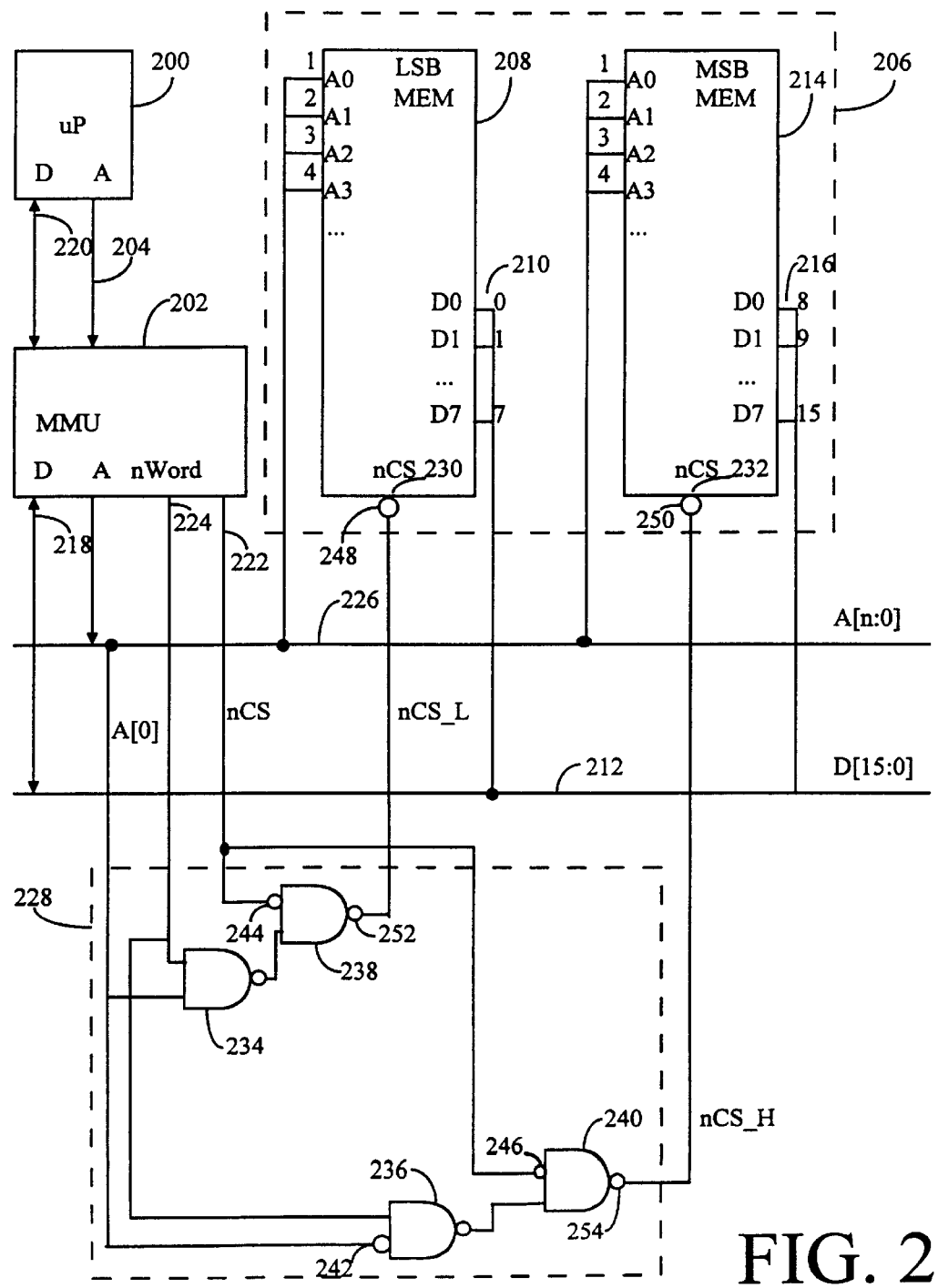
FIG. 2 is a block diagram of another microprocessor-based system, according to an embodiment of the present invention.

FIG. 2 is a block diagram illustrating another example microprocessor-based system according to the present invention. In the example system of FIG. 2, a microprocessor 200 and an MMU 202 perform functions similar to those performed by the microprocessor 100 and the MMU 104 of the example system of FIG. 1. The microprocessor 200 transmits an address to the MMU 202 using an address bus 204. In response to receiving the address from the microprocessor 200, the MMU 202 generates address signals for accessing a program memory 206.

The program memory 206 is illustrated as a 16-bit wide memory implemented using two 8-bit memory devices. For each 16-bit data word, a least significant byte (LSB) memory 208 outputs the lower eight bits (i.e., bits 0 through 7) at a set of data pins 210. The bits are sent to the MMU 202 using a data bus 212. A most significant byte (MSB) memory 214 similarly outputs the upper eight bits (i.e., bits 8–15) of the 16-bit data word at a set of data pins 216 for transmission using the data bus 212. The MMU 202 receives the data from the data bus 212 using a set of data pins 218 and sends the data to the microprocessor 200. The microprocessor 200 then receives the data using a set of data pins 220.

With the LSB memory 208 and the MSB memory 214 connected in parallel, the MMU can retrieve 16-bit data words more quickly than it can using a single 8-bit memory, as illustrated in FIG. 1. For example, a single cycle for accessing the program memory 206 can be used to retrieve a 16-bit data word. Accordingly, during a single processor cycle, the MMU 202 can perform a single access to the program memory 206 to retrieve two 8-bit data words that form the 16-bit data word. Retrieving both 8-bit data words using a single access rather than two consecutive accesses reduces the delay in retrieving the 16-bit data word.

The MMU 202 uses a chip selection signal nCS provided at a pin 222 to enable the program memory 206. In addition, the MMU 202 uses a number of signals to selectively enable the individual memories of the program memory 206. A data word width selection signal nWord provided at a pin 224 enables the MMU 202 to selectively retrieve an 8-bit data word or a 16-data word from the program memory 206. When the MMU 202 retrieves an 8-bit data word from the program memory 206, the least significant bit A[0] of the address signal is used to selectively enable either the LSB memory 208 or the MSB memory 214.

Chip selection logic 228 processes the chip selection signal nCS, the data word width selection signal nword, and the least significant bit A[0] of the address signal to selectively enable the LSB memory 208, the MSB memory 214, or both using respective chip select pins 230 and 232 of the LSB memory 208 and the MSB memory 214. For example, if the signals nCS and nword are active low, the chip selection logic 228 may be implemented using NAND gates 234, 236, 238, and 240 and inverters 242, 244, 246, 248, and 250, arranged as depicted in FIG. 2.

In the arrangement depicted in FIG. 2, when the chip selection signal NCS is in a high logic state, a least significant byte chip selection signal nCS__L and a most significant byte chip selection signal nCS__H, respectively provided at outputs 252 and 254 of the NAND gates 238 and 240 are in the high logic state. With both chip selection signals in this state, both memories 208 and 214 of the program memory 206 are disabled.

When the chip selection signal nCS is in a low logic state, at least one of the LSB memory 208 and MSB memory 214 is enabled. The particular memory or memories so enabled are determined by the state of the data word width selection signal nword and the least significant bit A[0] of the address signal.

When the data word width selection signal nWord is in the low logic state, the least significant byte chip selection signal NCS__L and the most significant byte chip selection signal NCS__H are in the low logic state. The chip selection signals thus enable both the LSB memory 208 and the MSB memory 214. The uppermost (N–1) bits of the N-bit address signal address a location in both memories 208 and 214. Because the address bits used to address the memories 208 and 214 are the same, the MMU 202 retrieves 8-bit data words from similar locations in the LSB memory 208 and the MSB memory 214 and forms a 16-bit data word. Accordingly, when the data word width selection signal nword is in the low logic state, the MMU 202 retrieves a 16-bit data word from the program memory 206.

When the data word width selection signal nword is in the high logic state, only one of the LSB memory 208 and the MSB memory 214 is enabled, and the MMU 202 retrieves an 8-bit data word from the program memory 206. The state of the least significant bit A[0] of the address signal determines whether the MMU 202 retrieves the 8-bit data word from the LSB memory 208 or the MSB memory 214. If the least significant bit A[0] is in the low logic state, the least significant byte chip selection signal NCS__L is in the low logic state, while the most significant byte chip selection signal NCS__H is in the high logic state. Because the chip selection signals of the LSB memory 208 and MSB memory 214 are active low, the LSB memory 208 is enabled, while the MSB memory 214 is disabled. The MMU 202 thus retrieves data only from the LSB memory 208.

Conversely, when the least significant bit A[0] of the address signal is in the high logic state, the least significant byte chip selection signal NCS__L is in the high logic state, and the most significant byte chip selection signal NCS__H is in the low logic state. As a result, the MMU 202 retrieves data from the MSB memory 214, which is enabled. The LSB memory 208 is disabled and provides no data to the MMU 202.

It should be understood that other arrangements may be used to implement the chip selection logic 228 without departing from the teaching of the present invention. For example, a multiplexer with appropriately configured inputs can implement the chip selection logic 228. Furthermore, if the chip selection signals of the LSB memory 208 and the MSB memory 214 are active high rather than active low, a slightly modified arrangement can implement the chip selection logic 228.

Figure 3:
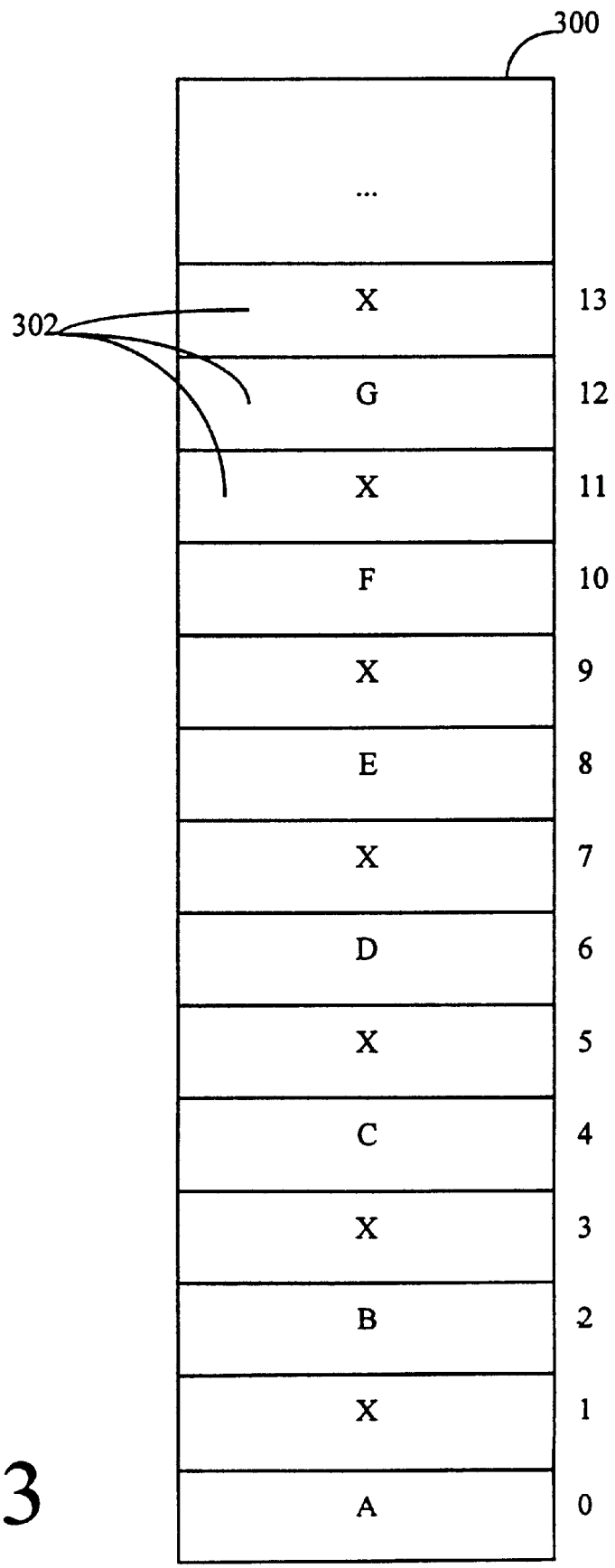
FIG. 3 is a diagram illustrating one configuration for storing program instructions in a program memory of a microprocessor-based system, according to an embodiment of the present invention.

FIG. 3 illustrates an example configuration for storing program instructions in a program memory for retrieval and execution by a microprocessor-based system according to the present invention. A program memory 300 stores the program instructions at a plurality of locations 302. In the example configuration of FIG. 3, the program memory 300 is eight bits wide and stores 8-bit data words labeled A through G at locations 302. The 8-bit data words can be program instructions or portions of program instructions. It should be understood that the program memory 300 typically includes thousands of addressed locations. FIG. 3 is simplified in this regard to facilitate the discussion. A microprocessor or MMU accesses the locations 302 using address signals. For example, to retrieve the data word labeled C, the microprocessor or MMU addresses the location 302 having the address 4.

Figure 4:
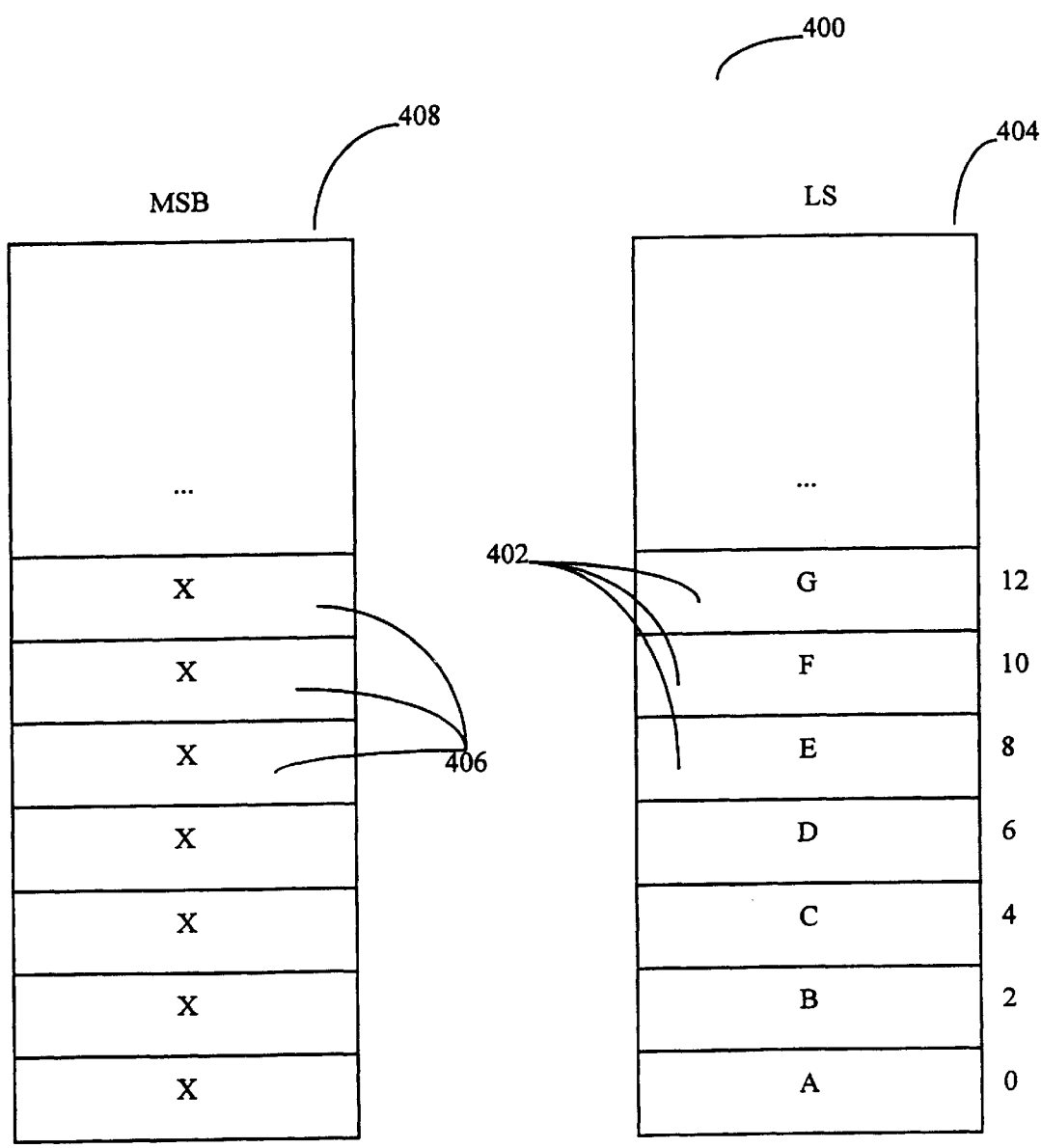
FIG. 4 is a diagram illustrating another configuration for storing program instructions in a program memory of another microprocessor-based system, according to an embodiment of the present invention.

FIG. 4 illustrates another example configuration for storing program instructions in a program memory for retrieval and execution by a microprocessor-based system according to the present invention. A program memory 400 stores the program instructions at a plurality of locations 402. In the example configuration of FIG. 4, even-numbered addresses correspond to locations 402 in an LSB memory 404. Odd-numbered addresses correspond to locations 406 in an MSB memory 408. In this example configuration, the program memory 400 stores 8-bit data words at the locations 402 in the LSB memory 404. Because the program instructions are stored only at locations 402 having even-numbered addresses, the contents of the MSB memory 408 are not critical to initializing the microprocessor. Accordingly, the Xs in the MSB memory 408 indicate that the locations 406 of the MSB memory 408 may store any data.

The microprocessor-based system is often unaware of the width of the program memory until the width is specified. Different storage formats are used to store data, depending on the width of the program memory. For example, as illustrated in FIG. 3, an 8-bit memory stores 8-bit data words at locations whose addresses increase by a certain value, such as one. As illustrated in FIG. 4, however, a 16-bit memory stores 16-bit data words at locations whose addresses increase by a different value, such as two.

In the example configurations of FIGS. 3 and 4, the program memory stores the data words labeled A through G at locations having even-numbered addresses. The Xs in FIGS. 3 and 4 illustrate that the locations of the program memory having odd-numbered addresses can store any data, as the microprocessor-based system does not retrieve their contents. With the data words stored at locations having even-numbered addresses, the microprocessor-based system can retrieve the data words regardless of which bit-width (e.g., 8 bits or 16 bits) is used to store the data words. The microprocessor-based system can therefore retrieve the data words without prior knowledge of the bit-width of the program memory. In order to retrieve the data words thus stored, the MMU includes additional logic for mapping the address signals issuing from the microprocessor to addresses corresponding to the locations in the program memory at which the program instructions are stored. For example, if the program instructions are stored at locations having even-numbered addresses, the additional logic multiplies the addresses from the microprocessor by two to convert them to even-numbered addresses for addressing the program memory. A multiplier circuit, such as a conventional shift register, may perform this multiplication.

In certain application environments, the boot area of the program memory stores interrupt vectors or other information. As a result, one portion of the boot area may lack sufficient space to store an initialization program for selecting a memory configuration to be used by the microprocessor-based system for retrieving program instructions. In such application environments, the initialization program may be stored at other locations in another portion of the boot area. If the program instructions are stored at these other locations, the additional logic for mapping the address signals also adds an offset value to or subtracts and offset value from the addresses from the microprocessor. Conventional logic, such as an adder or a subtractor, may be used to add or subtract the offset value.

In order to ensure that the microprocessor-based system retrieves additional program instructions properly after executing the initialization program, the initialization program typically disables the address-mapping logic or otherwise reconfigures the address-mapping logic to allow the microprocessor to retrieve the additional instructions. For example, the program memory typically stores the additional program instructions at continuously addressed locations, rather than at locations having even-numbered addresses. In such applications, the initialization program disables the multiplier or shift register after the microprocessor completes execution of the initialization program. Additionally, if the instructions used for selecting the memory configuration are stored at locations in the program memory outside the boot area, the initialization program also disables the adder. With the adder disabled, the microprocessor or MMU retrieves program instructions from the boot area after jumping to the other area of the program memory to retrieve and execute the instructions for selecting the memory configuration.

The various embodiments described above are provided by way of illustration only and should not be construed to limit the invention. Those skilled in the art will readily recognize various modifications and changes that may be made to the present invention without strictly following the example embodiments and applications illustrated and described herein, and without departing from the true spirit and scope of the present invention, which is set forth in the following claims. For example, while the embodiments described above are discussed as configuring the microprocessor to retrieve and execute program instructions from either an 8-bit or a 16-bit program memory, the program memory may have any of a variety of possible bit-widths.

What is claimed is:

1. A microprocessor circuit arrangement, the circuit arrangement including a microprocessor having address signals generated to retrieve instructions and capable of executing a set of instructions in a start-up mode, and a memory arrangement that is responsive to the microprocessor and configured to generate the address signals, to retrieve the set of instructions and to provide the instructions to the microprocessor, the circuit arrangement comprising:

a program memory that stores the set of instructions in noncontiguously-addressed memory locations using a plurality of possible bit-widths, wherein the memory arrangement is coupled to the program memory and responds to a chip selection signal by enabling the program memory and responds to a data word width selection signal and a least significant bit address signal by selectively retrieving multiple bit data words from the program memory; and a byte interleaver circuit configured to respond to a microprocessor-reset signal by mapping the address signals for retrieving the set of instructions, the byte interleaver circuit returning to the microprocessor a set of instructions in a first bit-width from where the instructions were stored, the byte interleaver circuit returning a set of instructions in a second bit-width from where the instructions were stored, the first and second bit-widths being different, the set of instructions causing the microprocessor to select a memory configuration as a function of the bit-width and to reconfigure the byte interleaver circuit for retrieving additional instructions rather than the set of instructions.

2. The circuit arrangement of claim 1, wherein the byte interleaver circuit is adapted to generate a set of second address signals representing the first address signals and an offset value, wherein the second address signals are used to retrieve the set of instructions.

3. The circuit arrangement of claim 2, wherein the byte interleaver circuit is selected from the group consisting of a shift register, an adding circuit and a subtracting circuit.

4. The circuit arrangement of claim 2, wherein the program memory is disabled when the chip selection signal is in the high state.

5. The circuit arrangement of claim 2, wherein a portion of the program memory is enabled when the chip selection signal is in the low state.

6. The circuit arrangement of claim 5, wherein all of the program memory is enabled when the chip selection signal and the data word width selection signals are in the low state, such that a 16-bit data word is retrievable from the program memory.

7. The circuit arrangement of claim 6, wherein the program memory is composed of at least two memory locations that include a least significant byte and a most significant byte.

8. The circuit arrangement of claim 7, wherein at least one of the memory locations is enabled when the data word width selection signal is in the high state, such that an 8-bit data word is retrievable from the program memory.

9. The circuit arrangement of claim 8, wherein only the least significant byte is enabled when a least significant bit is in the low state.

10. The circuit arrangement of claim 8, wherein only the most significant byte is enabled when a least significant bit is in the high state.

11. The circuit arrangement of claim 2, wherein the data words are stored at locations having even numbered addresses.

12. The circuit arrangement of claim 1, wherein the program memory is configured and arranged to store the set of instructions in noncontiguously-addressed memory locations in a boot area of the program memory.

13. A microprocessor circuit arrangement, comprising:
a microprocessor having first address signals generated for retrieving instructions and capable of executing a set of instructions in a start-up mode;
a memory management arrangement, responsive to the microprocessor and configured and arranged to generate the address signals, to retrieve the set of instructions, and to provide the instructions to the microprocessor, wherein the memory management arrangement includes a chip selection logic circuit that is adapted to process a chip selection signal, a data word width selection signal and a least significant bit of the address signal to selectively enable all or portions of a program memory;
the program memory coupled to the memory arrangement and storing the set of instructions using one of a plurality of possible bit-widths in noncontiguously-addressed memory locations selected such that the set of instructions can be retrieved regardless of which bit-width is used in storing the set of instructions; and
a byte interleaver circuit configured to respond to a microprocessor-reset signal by mapping a second set of address signals representing the first address signals and an offset value, wherein the second set of address signals are used to retrieve the set of instructions regardless of which bit-width is used in storing the set of instructions,
the set of instructions causing the microprocessor to select a memory configuration as a function of the bit-width used in storing the set of instructions and to reconfigure the byte interleaver circuit for retrieving additional instructions rather than the set of instructions.

14. A method for retrieving data words from a microprocessor based system after reset, the method comprising:
providing a microprocessor-based system that includes a memory management unit for generating first address signals for retrieving instructions;
providing a program memory including at least two memory devices connected in parallel for storing the instructions in noncontiguously-addressed memory locations within the two memory devices;
providing a byte interleaver circuit adapted to generate a second set of address signals representing the first address signals and an offset value, the second set of address signals used to retrieve the set of instructions;
providing a chip selection logic circuit that is adapted to process a chip selection signal that enables the program memory; and
retrieving a data word from the program memory as a function of the chip selection signal, a data word width selection signal and a least significant bit of the address signal.

15. The method of claim 14, further including the step of disabling the program memory when the chip selection signal is in the high state.

16. The method of claim 14, further including the step of enabling a portion of the program memory when the chip selection signal is in the low state.

17. The method of claim 16, further including the step of enabling all of the program memory when the chip selection signal and the data word width selection signals are in the low state, such that a 16-bit data word is retrievable from the program memory.

18. The method of claim 17, wherein the step of providing the program memory devices includes providing a least significant byte device and a most significant byte device.

19. The method of claim 18, further including the step of enabling only the least significant byte when a least significant bit is in the low state.

20. The method of claim 18, further including the step of enabling only the most significant byte when a least significant bit is in the high state.

* * * * *